(12) United States Patent
Foote

(10) Patent No.: US 6,401,535 B1
(45) Date of Patent: Jun. 11, 2002

(54) ACTIVE COVER ACCELEROMETER

(75) Inventor: Steven A. Foote, Issaquah, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,894

(22) Filed: Jan. 27, 2000

Related U.S. Application Data

(62) Division of application No. 08/943,719, filed on Oct. 3, 1997, now Pat. No. 6,041,655.
(60) Provisional application No. 60/044,034, filed on Apr. 22, 1997.

(51) Int. Cl.[7] ............................................... G01P 15/08
(52) U.S. Cl. ..................................... 73/514.29; 438/52
(58) Field of Search ....................... 73/514.29, 514.36, 73/514.21, 514.22, 514.23, 514.32, 514.37; 438/50, 52

(56) References Cited

U.S. PATENT DOCUMENTS 4,736,629 A * 4/1988 Cole ....................... 73/514.32

* cited by examiner

Primary Examiner—John E. Chapman

(57) ABSTRACT

A pendulous accelerometer wherein the active reaction mass is pendulously mounted external to a fixed support structure and may include sensor cover or covers in the total active reaction mass.

2 Claims, 3 Drawing Sheets

ACTIVE COVER ACCELEROMETER

This application is a division of U.S. patent application Ser. No. 08/943,719 filed Oct. 3, 1997, now U.S. Pat. No. 6,041,655 which claims priority from U.S. provisional application Ser. No. 60/044,034 filed Apr. 22, 1997, each of which is incorporated herein by reference.

BACKGROUND OF THE INVENTION

The invention relates to acceleration sensors, and in particular to a reaction mass used with a pendulous accelerometer.

Pendulous accelerometers, for example, vibrating beam accelerometers, capacitive accelerometers, capacitive rebalance accelerometers, and translational mass accelerometers comprise a reaction mass. Existing design and manufacturing techniques for these devices are described in U.S. Pat. No. 4,495,815 "Mass And Coil Arrangement For Use In An Accelerometer," U.S. Pat. No. 5,396,798 "Mechanical Resonance, Silicon Accelerometer," U.S. Pat. No. 4,766,768 "Accelerometer With Isolator For Common Mode Inputs," U.S. Pat. No. 5,228,341 "Capacitive Acceleration Detector Having Reduced Mass Portion," U.S. Pat. No. 5,350,189 "Capacitance Type Accelerometer For Air Bag System," U.S. Pat. No. 4,335,611 "Accelerometer," and U.S. Pat. No. 3,702,073 "Accelerometer" which are incorporated herein by reference.

All practical pendulous accelerometers to date function on the principle of Neuton's law that force equals mass times acceleration. In many accelerometer applications high performance and small size are desirable. One problem with the design of small, high performance pendulous accelerometer sensor s involves obtaining adequate reaction mass in a small space. A second problem with the design of small, high performance pendulous accelerometer sensors involves providing adequate isolation from the mounting structure such that mounting strains do not affect accelerometer performance.

Typical accelerometer sensors include a pendulous reaction mass, often referred to as a proof mass, suspended from a stationary frame by, for example, a flexural suspension member or some other form of pivot mechanism. This pivot constrains the reaction mass to only one direction of motion; the reaction mass is free to move along this one direction of motion unless restrained to the null position. The pendulous reaction mass must be restrained under acceleration by an opposing force which may be the result of a position feedback circuit. Alternatively, the accelerometer may be an open-loop loop device in which the opposing force may be supplied a spring in the form of, for example, pivot stiffness.

In a typical accelerometer sensor mechanism the pendulous reaction mass is suspended on a flexural suspension member inside an external support frame. Isolation is typically provided by mounting the supporting frame itself inside an isolation feature supported from a final exterior frame which provides mounting both to sensor covers and to the accelerometer housing. The above features as practiced in a typical vibrating beam accelerometer sensor are shown in FIGS. 1 and 2. The large exterior frame system is static and adds no mass to the active reaction mass. Additionally, any external strain couples through the exterior frame system directly across the length of the sensor mechanism. The resulting large frame dimensions tend to maximize the effect of error drivers, for example, thermal expansion mismatch, placing additional burden on the isolator function.

SUMMARY OF THE INVENTION

The present invention resolves significant problems of the prior art by providing both superior mounting stress isolation and substantially reduced acceleration sensor mechanism size while maintaining adequate mass in the reaction mass without increasing manufacturing costs. In the present invention the external frame isolation system is eliminated and the remaining structure becomes the active reaction mass. The present invention describes various embodiments optimized for various g-range applications. The illustrated embodiments substantially reduce mechanism size and maximize active mass while maximizing isolation from external error sources and minimizing heat flow.

DETAILED DESCRIPTION OF THE PREFERRED EMBODIMENTS

The present invention resolves significant problems of the prior art by providing both superior mounting stress isolation and substantially reduced acceleration sensor mechanism size while maintaining adequate mass in the reaction mass without increasing manufacturing costs.

An accelerometer sensor may include pendulous reaction mass, often referred to as a proof mass, suspended from a stationary frame by, for example, a flexural suspension member or some other form of pivot mechanism. This pivot constrains the reaction mass to travel along only one axis unless the reaction mass is restrained to the null position.

Figure 1:
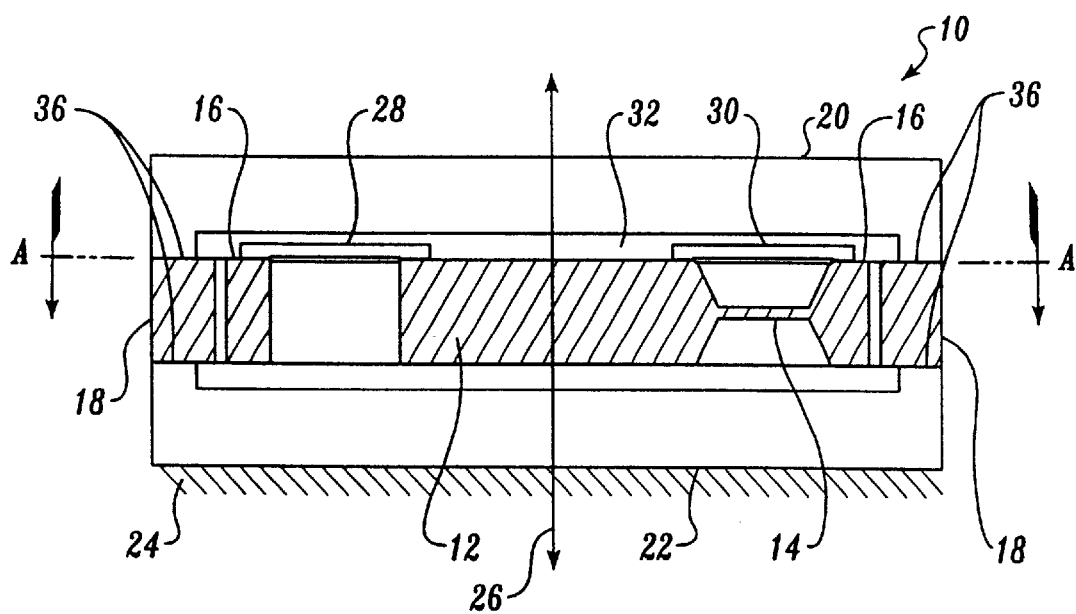
FIG. 1 illustrates, one prior art device using vibrating beam technology.
Figure 2:
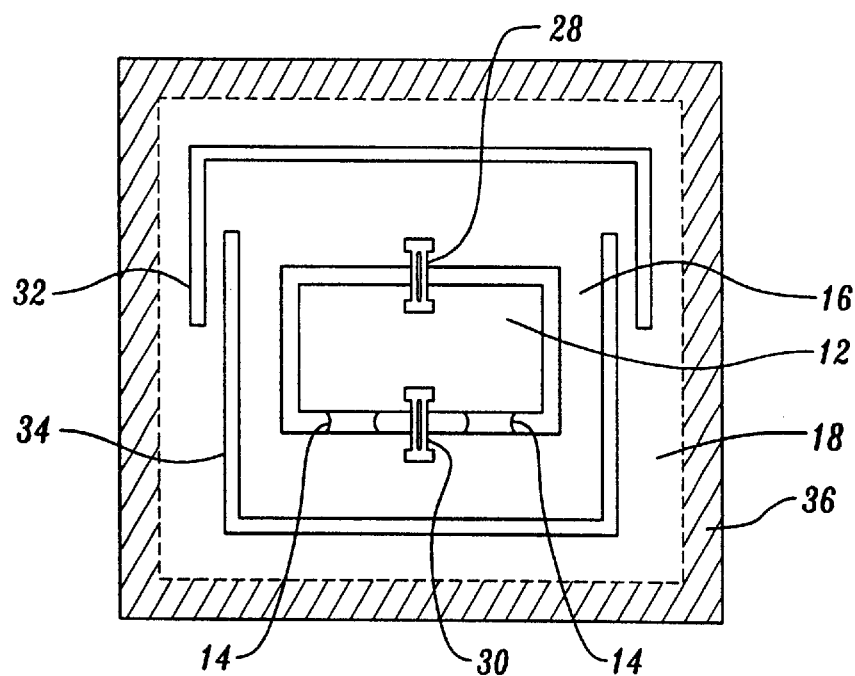
FIG. 2 is a cross sectional view of the device illustrated in FIG. 1 taken along section line A—A.

FIGS. 1 and 2 illustrate a typical vibrating beam acceleration sensor mechanism 10 having a pendulous reaction mass 12 suspended on a flexural suspension member 14 inside a first external support frame 16. Support frame 16 itself is typically mounted inside an isolation feature suspended from a final exterior frame 18 that provides mounting both for top cover 20 and bottom cover 22. Typically, sensor 10 is mounted within the accelerometer housing 24, represented by ground, by fixing bottom cover 22 to accelerometer housing 24. Alternatively, the sensor packaging is reconfigured such that sensor 10 is mounted by attaching top cover 20 to accelerometer housing 24. In the typical accelerometer of FIGS. 1 and 2, exterior frame 18 is much larger than reaction mass 12 and larger than external support frame 16. In operation the relatively large exterior frame system comprising support frame 16 and external frame 18 remains static relative to the pendulous reaction mass. Thus, support frame 16 and external frame 18 add no reaction mass to active reaction mass 12.

Reaction mass 12 is free to move relative to support frame 16. However, reaction mass 12 is typically constrained to movement along an input axis 26 aligned substantially perpendicular to the plane of reaction mass 12. Thus, an input force, for example, an acceleration input, applied along input axis 26 displaces reaction mass 12 a distance, x, along input axis 26. Vibrating beam force sensors 28, 30 are mounted to extend between central support frame 16 and reaction mass 12 such that displacement of reaction mass 12 relative to support frame 16 imparts either a compressive or a tensile force to force sensors 28, 30.

External strains experienced by the accelerometer housing may affect acceleration sensor performance. External strains may be caused by, for example, mismatch of thermal expansion coefficients between structural members, physical distortions of housing mounts due to clamping forces, or shocks and vibrations experienced by the housing. In the example illustrated in FIGS. 1 and 2, external strains experienced by accelerometer housing 24 are transmitted to external frame 18 through the structure connecting external frame 18 to accelerometer housing 24, for example, through bottom cover 22. A typical design provides isolation between vibrating beam force sensors 28, 30 and external strains experienced by external frame 18. The isolation feature may comprise, for example, isolation slots 32, 34. Although vibrating beam force sensors 28, 30 and reaction mass 12 are isolated from external frame 18 by an isolation feature, for example, isolation slots 32, 34, external strain experienced by accelerometer housing 24 may couple through exterior frame 18 and the isolation features directly across the length of sensor mechanism 10. Additionally, the large dimensions of external frame 18 tend to maximize the effect of error drivers, for example, thermal expansion mismatch, placing an additional burden on the isolator function.

Figure 3:
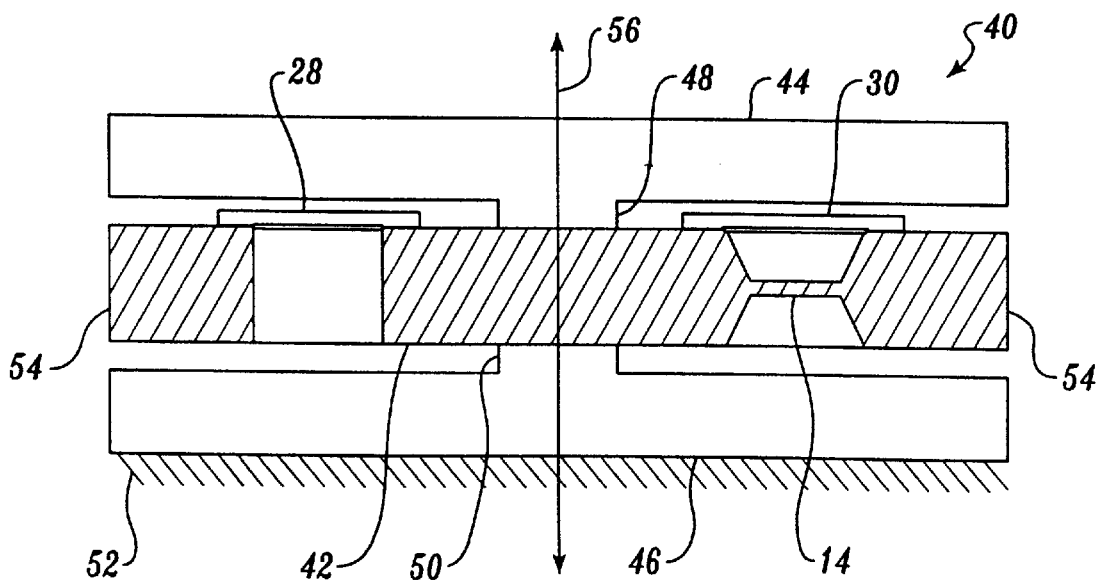
FIG. 3 illustrates an internal mount acceleration sensor mechanism according to one embodiment of the present invention.

One embodiment according to the present invention as practiced in a vibrating beam acceleration sensor is illustrated in FIG. 3 by inverting the typical accelerometer mounting system. The acceleration sensor mechanism 40 of FIG. 3 provides an internal mount/external reaction mass configuration wherein the external frame isolation system is eliminated and the remaining structure becomes the active reaction mass. According to the embodiment illustrated in FIG. 3, reaction mass 12 is replaced by an internal frame member 42 sandwiched between top cover 44 and bottom cover 46 wherein each cover 44, 46 is formed with a central pedestal portion 48, 50, respectively. Central pedestal portions 48, 50 are bonded to opposing surfaces of internal frame member 42 using a suitable bonding method, for example, epoxy bonding. In one embodiment of the present invention, bottom cover 46 is mounted to an accelerometer housing 52 represented by ground. Thus, internal frame member 42 and covers 44, 46 are combined to form a single frame structure fixed to accelerometer housing 52. Alternatively, acceleration sensor 40 is mounted by fixing top cover 44 to accelerometer housing 52. According to the embodiment illustrated in FIG. 3, an external reaction mass 54 is disposed around and external to internal frame member 42 and rotatably suspended therefrom by, for example, a flexural suspension member 14 or another suitable form of pivot mechanism. External reaction mass 54 is formed with an internal passage through its thickness suitable to nest internal frame member 42 rotatably within the passage. Reaction mass 54 and internal frame member 42 may be formed of a single piece of substantially planar substrate material, for example, quartz or silicon, using, for example, laser cutting technology or other manufacturing techniques known to those of skill in the art. Flexural suspension member 14 may also be formed in the single substrate. Reaction mass 54 is constrained, for example, by the hinge mechanism or other means, to movement along an input axis 56 substantially perpendicular to the plane of the substrate. Thus, an input force, for example, an acceleration input, applied along input axis 56 displaces reaction mass 54 a distance, x, along input axis 56. Vibrating beam force sensors 28, 30 are mounted to extend between internal frame member 42 and reaction mass 54 such that displacement of reaction mass 54 relative to internal frame member 42 imparts either a compressive or a tensile force to force sensors 28, 30.

The present invention also results in increased isolation from both external stresses and mounting stresses by providing localized strain coupling instead of multiplying external strain coupling across the length of the mechanism. According to the embodiment illustrated in FIG. 3, the isolation function of external isolation features, for example, isolation slots 32, 34, is obviated. Rather, the isolation function is performed by central pedestals 48, 50. Central pedestals 48, 50 isolate the sensor mechanism from external strains by reducing the interface area to a minimum and by placing the interface point at the center of sensor mechanism 40 such that the moment arm over which any strain-induced force acts is also reduced to a minimum. Thus, stress magnitude is minimized and constrained to a small locality. The stressed locality is nearly ideal because it is centrally located and symmetrical relative to the vibrating beam force sensors.

Strain-induced forces and forces developed at the interface between central pedestals 48, 50 and internal frame member 42 may be further reduced by fixing pedestals 48, 50 to internal frame member 42 using a compliant epoxy bonding technique, for example, the techniques disclosed in U.S. Pat. No. 5,532,665 or U.S. patent application Ser. No. 08/665,036 entitled "Low Stress Magnet Interface" and assigned to the assignee of the present patent application, both of which are incorporated herein by reference, or by conventional epoxy bonding techniques known to those of skill in the art. When the isolation function is thus obviated, the volume previously occupied by central support frame 16 and external frame 18 is available to accommodate a larger active reaction mass without increasing the overall acceleration sensor dimensions.

Additionally, the embodiment of the present invention illustrated in FIG. 3 provides an increased pendulous arm length, the distance from the pivot point of flexural suspension member 14 to the tip of reaction mass 54, by increasing the dimensions of active reaction mass 54 and positioning active reaction mass 54 external to internal frame member 42. Thus, the available mass is used more efficiently.

Alternatively, the present invention according to the embodiment illustrated in FIG. 3 may be scaled down to use a reaction mass 54 which occupies less than the volume formerly occupied by support frame 16 and external frame 18. Thus, an acceleration sensor having an active reaction mass commensurate with that of the configuration illustrated in FIGS. 1 and 2 occupies less volume than if configured according to typical sensor designs. Those of skill in the art will recognize that present invention provides an opportunity to trade volume for pendulousity and vice versa along a continuum ranging from maintaining the original active reaction mass in a reduced volume sensor to increasing the active reaction mass to fill the original volume. Those of skill in the art will further recognize that the degree to which volume is traded for active reaction mass is dependent on many design factors including, for example, available space in which to mount the acceleration sensor, the Grange required by the application, and the materials used in manufacturing the sensor.

The embodiment of the present invention illustrated in FIG. 3 further provides improved thermal response. The heat capacity of suspended reaction mass 54. is lower because the internal mount/external reaction mass configuration provides greater pendulousity using less total pendulous mass. Thus, the raw thermal response time is quicker due to the higher mass efficiency of the reaction mass. Further thermal response aid results from the centrally localized mounting. Because the heat source is centrally localized, heat flow paths are simplified. The heat flow paths are nearly symmetrical and easily controlled by conventional methods which allows more precise thermal ramp matching. According to the embodiment shown in FIG. 3, the heat flow path between the heat source at housing 52 to the detector elements, force sensors 28, 30, begins at the interface between housing 52 and bottom cover 46 and is channeled into internal frame member 42 through pedestal portion 50 which is the single point interface between bottom cover 46 and internal frame member 42. Although external reaction mass 54 may present some secondary effects, the dominant heat flow path between pedestal portion 50 and force sensors 28, 30 is through internal frame member 42. Thus, the heat flow is easily modeled for computer analysis. In contrast, the heat flow path of the prior art embodiment shown in FIGS. 1 and 2 is far more complex and difficult to model. The heat flow path of the prior art embodiment shown in FIGS. 1 and 2 is through bottom cover 22 into exterior frame 18 via peripheral interface 36 (cross-hatched area of exterior frame 18 shown in FIG. 1) between bottom cover 22 and exterior frame 18. The heat flow analysis is further complicated by heat flow from exterior frame 18 into top cover 20 at interface 36. The heat flow path continues into support frame 16 through the isolation feature and through the irregular shape of support frame 16 to force sensors 28, 30. Secondary effects are presented by heat flow through hinge 14 into pendulous reaction mass 12 and through reaction mass 12 into force sensors 28, 30. According to the embodiment of FIG. 3, the improved heat flow paths combined with the reduced heat capacity in the reaction mass produces smaller more quickly dissipated heat-induced errors when compared with the prior art embodiment shown in FIGS. 1 and 2.

Isolation features may be added around central mounting pedestals 48, 50 to further decouple stress and control heat flow. The isolation features may be, for example, similar to eliminated isolation slots 32, 34 between support frame 16 and external frame isolator 18 or other isolation designs known to those of skill in the art. Additionally, isolation features may be much smaller than disclosed in the prior art and still prove more effective against the lower initial stress levels because the internal mount/external reaction mass configuration decouples stress and controls heat flow. Thus, simple isolation features, for example, isolation slots 32, 34, a "C" shaped slot, a pair of "( )" shaped slots or other isolation features known to those of skill in the art will both dissipate stress and direct heat flow. However, isolation features are outside the scope of this invention and are not shown.

Practical accelerometers also generally require a source of reaction mass damping and shock stops for the reaction mass. Typical accelerometer sensors provide shock stops to keep the motion of the reaction mass from over stressing the flexures and, in a vibrating beam accelerometer such as depicted in FIG. 1, from stressing the vibrating beam force sensors when the reaction mass experiences large acceleration inputs. The shock stops typically comprise physical constraints which limit the motion of the reaction mass along the input axis. The reaction mass shock stop function is often obtained by locating the reaction mass between two stationary cover plates. In the configuration depicted in FIG. 1, top cover 20 and bottom cover 22 provide the shock stops for reaction mass 12. The motion of reaction mass 12 is limited by actual physical contact with either top cover 20 or bottom cover 22.

According to the embodiment of the present invention as illustrated in FIG. 3, shock stops are provided by top and bottom covers 44, 46. The motion of reaction mass 54 is physically limited by the proximity of covers 44, 46. Any displacement, rotational or translational, of reaction mass 54 along input axis 56 is restricted by physical contact with either top cover 44 or bottom cover 46.

Often, viscous gas damping of the reaction mass is desirable and sometimes necessary to avoid the effects of undesirable reaction mass oscillations which may deteriorate sensor performance. Gas damping typically involves locating a pressurized fluid, for example, oil, air or a mixture of inert gases such as nitrogen and helium, in contact with the reaction mass, thereby controlling the effects of an oscillation which would deteriorate the performance of the device. For example, a shock or vibration input force can cause the reaction mass to oscillate back and forth about its rest position after the force has been re moved from the reaction mass. Undesirable oscillations can also be caused by vibrations in the surrounding structure. The reaction mass damping function may be obtained by sandwiching the reaction mass between the two stationary cover plates and introducing fluid or gas pressure into the chamber surrounding the reaction mass. Typically, the gas pressure is substantially above vacuum pressure, for example, on the order of about one atmosphere. In a gas-filled mechanism, the closely spaced cover plates constrain the gas such that squeeze film effects provide damping of the reaction mass along the input axis. In a traditional configuration the cover plates are bonded directly to the mechanism frame for accurate control of the shock and damping gap spacing. In the example of FIGS. 1 and 2, cover plates 20, 22 are bonded to the cross-hatched area of external frame 18 at bond lines 36. Pressurized gas is introduced into sensor mechanism 10 and trapped in the chamber surrounding reaction mass 12. Thus, as reaction mass 12 attempts a, motion toward top cover 20 during oscillation, the pressurized gas trapped between reaction mass 12 and top cover 20 is squeezed, and when reaction mass 12 attempts a motion toward bottom cover 22, the trapped pressurized gas is squeezed between reaction mass 12 and bottom cover 22. Thus, oscillations of reaction mass 12 are damped by the resistance of the pressurized gas to being further compressed or squeezed.

The traditional configuration, for example, the configuration of FIGS. 1 and 2, locates most of the mechanism mass statically relative to the accelerometer housing such that it contributes no mass to the active reaction mass. As accelerometer size is reduced or scaled down, the active or useful mass of the reaction mass is reduced. Therefore the force available to be sensed for a given acceleration is reduced in proportion to the reduction in reaction mass. As the available force shrinks, the significance of the noise level for any given sensing mechanism increases, limiting the resolution and accuracy of the accelerometer. In other words, the signal-to-noise ratio decreases with decreasing reaction mass and accelerometer resolution and accuracy are reduced proportionally. Thus, size reduction through scaling is limited by the necessity of maintaining a minimum significant amount of active reaction mass. While the embodiment of the invention shown in FIG. 3 provides greater reaction mass efficiency than typical sensor designs and is a preferred embodiment for some applications, other applications, for example, lower g-range applications requiring accurate sensing of accelerations in the micro-g range, may benefit from even greater reaction mass efficiency.

Figure 4:
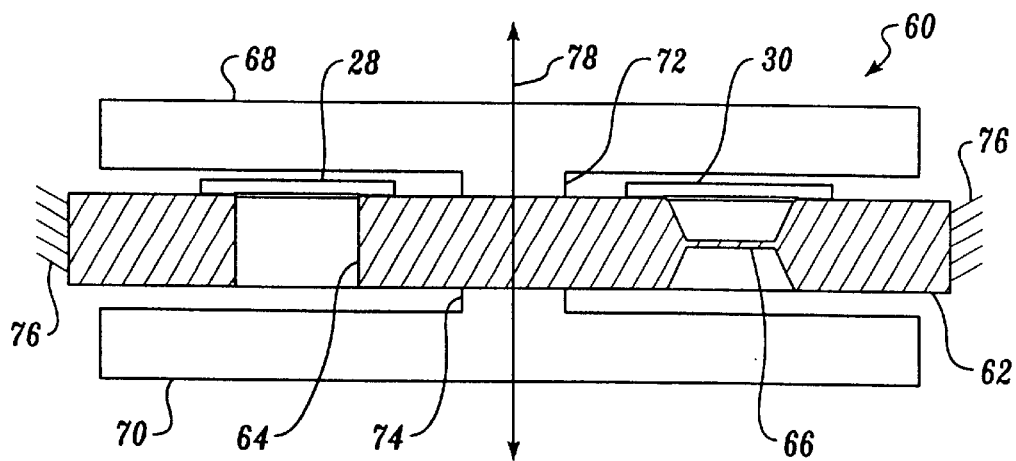
FIG. 4 illustrates an active cover acceleration sensor mechanism according to another embodiment of the present invention.
Figure 5:
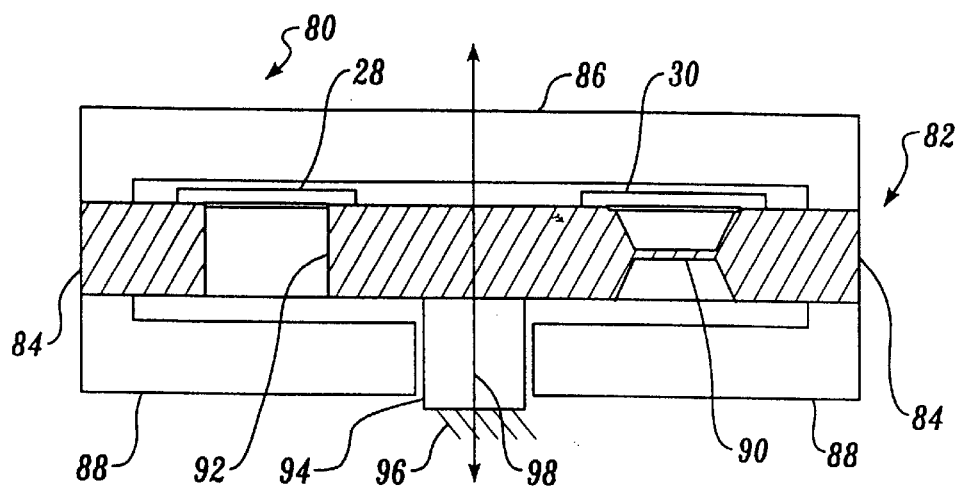
FIG. 5 illustrates an internal mount acceleration sensor mechanism according to yet another embodiment of the present invention.

FIGS. 4 and 5 illustrate two further embodiments of the present invention optimized for low g range applications. For example, an accelerometer using either of the embodiments illustrated in FIGS. 4 and 5 may be used to measure accelerations in the micro-g range. The embodiments illustrated in FIGS. 4 and 5 provide substantially reduced mechanism size and maximum active reaction mass. In other words, the embodiments of FIGS. 4 and 5 provide maximum signal-to-noise ratio in a minimum size mechanism. In contrast to typical sensor designs, in FIG. 4 the arrangement of the reaction mass, frame and covers is altered such that the cover plates are instead bonded to the moving pendulum itself adding their mass to the active reaction mass. The resulting mechanism can be mounted by its frame such that the cover plates now move dynamically with the reaction mass and add their mass into the active reaction mass. In sensor 60, frame 62 is formed with, an internal passage through its thickness wherein internal pendulum portion 64 is nested. Internal pendulum portion 64 is suspended by flexure 66 from surrounding frame 62. Some or all of frame 62, internal pendulum 64 and flexural suspension member 66 may be formed of a single substantially planar substrate using manufacturing techniques known to those of skill in the art. The substrate material may be, for example, quartz, silicon or another suitable material. Frame 62 may include an isolation feature, for example, conventional isolation slots which divide frame 62 into an inner support frame and an external mounting frame. Vibrating beam force sensors 28, 30 extend between internal pendulum 64 and frame 62 such that displacement of internal pendulum 64 imparts either a compressive or a tensile force to vibrating beam force sensors 28, 30.

The mechanism of FIG. 4 overcomes the traditional limitations of conventional sensor designs by providing substantially reduced mechanism size and maximum active mass. In FIG. 4, top cover 68 and bottom cover 70 are formed with pedestal portions 72, 74, respectively. Top cover 68 and bottom cover 70 are bonded to opposing surfaces of internal pendulum 64. For example, top and bottom covers 68, 70 may be bonded to internal pendulum 64 at the geometric center of internal pendulum 64, at the center of mass of internal pendulum 64 or at the center of percussion of internal pendulum 64. Thus, top cover 68 and bottom cover 70 add their mass to the active mass of internal pendulum 64 which moves essential reaction mass to internal pendulum 64 and maximizes the active reaction mass without increasing sensor dimensions. The impact of the bonding interface between pedestal portions 72, 74 and internal pendulum 64 is minimized by the inherent symmetry of the design.

Pedestal portions 72, 74 are sized according to known design principles to provide adequate bond area to provide for proper alignment of covers 68, 70 and adequate bond strength in the specific application. Alternatively, pedestal portions 72, 74 may be formed on the opposing surfaces of internal pendulum 64 or may be discrete mechanical components.

Internal pendulum 64 is constrained to travel along an input axis 78 substantially perpendicular to the plane of internal pendulum 64 by, for example, providing flexure 66 with sufficient lateral stiffness to preclude motion in the plane of internal pendulum 64. Shock stop and damping functions are performed in the configuration of FIG. 4 by sandwiching frame 62 between top and bottom covers 68, 70. Thus, travel of internal pendulum 64 along input axis 78 is physically limited by covers 68, 70 contacting frame 62. Squeeze film damping is provided by providing equivalent gaps between stationary mechanism frame 62 and top and bottom covers 68, 70 and introducing a pressurized fluid into the gaps. Sensor 60 is mounted in an accelerometer housing 76, represented by ground, by mounting frame 62 to housing 76 using conventional mounting means, for example, by epoxy bonding.

The embodiment illustrated in FIG. 5 maximizes isolation from external error sources and maximizes active reaction mass while optimizing heat flow. The embodiment illustrated in FIG. 5 reverses the traditional roles of the elements. In this embodiment, the sensor is centrally mounted at the center of the structure which would form the pendulum in a traditional sensor. The covers are connected to the external supporting frame of the reaction mass. Thus, the structure which would traditionally form the pendulum instead forms the fixed mounting structure while the external pendulum portion combines with the covers to form the active reaction mass. This embodiment further provides sealing of the mechanism by fixing the external pendulum member to the covers. The combination of the external pendulum member and the covers provides an increased active reaction mass considerably in excess of the reaction mass of which the reaction mass was previously capable.

Thus, the embodiment of FIG. 5 provides substantially reduced mechanism size and, maximum active mass while maximizing isolation from external error sources and optimizing heat flow. In sensor 80, an external reaction mass 82 includes an external pendulum portion 84 fixed to an top cover 86 and a bottom cover 88. External reaction mass 82 is suspended by flexure 90 from internal frame member 92. External pendulum portion 84 is formed with an internal passage through its thickness wherein internal frame member 92 is nested. Some or all of external pendulum 84, internal frame member 92 and flexural suspension member 90 may be formed of a single substantially planar substrate using manufacturing techniques known to those of skill in the art. The substrate material may be, for example, quartz, silicon or another suitable material.

Internal frame member 92 may include an isolation feature, for example, one of the isolation systems described in connection with the embodiment of FIG. 3, above. External reaction mass 82 encloses internal frame member 92 in a chamber comprising a substantially planar external pendulum 84 sandwiched between top cover 86 and bottom cover 88. Top and bottom covers 86, 88 are fixed to opposing sides of external pendulum 84 using, for example, conventional epoxy bonding techniques, thus forming the top, bottom and side walls of a chamber which surrounds and substantially encloses internal frame member 92. For example, top and bottom covers 86, 88 m be bonded to external pendulum 84 of external reaction mass 82 along the periphery of external pendulum 84. Thus, top cover 86 and bottom cover 88 add their mass to the mass of external pendulum 84 which moves essential active reaction mass to external reaction mass 82 and maximizes the reaction mass without increasing sensor dimensions. External reaction mass 82 is constrained to movement along an input axis 98 substantially perpendicular to the plane of external pendulum 84 of external reaction mass 82 by flexure 90. Thus, an input force, for example, an acceleration input, applied along input axis 98 displaces external reaction mass 82 a distance, x, along input axis 98. Vibrating beam force sensors 28, 30 are mounted to extend between internal frame member 92 and external pendulum 84 of external reaction mass 82 such that displacement of external reaction mass 82 imparts either a compressive or a tensile force to vibrating beam force sensors 28, 30.

A central mounting pedestal 94 provides a connection between internal frame member 92 and the accelerometer housing 96, represented by ground. Central pedestal mount 94 is formed with two substantially parallel opposing surfaces. Central pedestal mount 94 passes through a passage formed in bottom cover portion 88 of external reaction mass 82 and one end is fixed to internal frame member 92 by, for example, conventional epoxy bonding techniques known to those of skill in the art. The opposing end of central pedestal mount 94 is fixed to accelerometer housing 96 by appropriate means. Alternatively, central pedestal mount 94 may be formed in an appropriate surface of housing 96. Central pedestal mount 94 is sized according to known design principles to provide adequate bond area to achieve proper alignment n:of external reaction mass 82 relative to housing 96 and adequate bond strength to support sensor mechanism 80 in the specific application. Thus, the embodiment of the present invention illustrated in FIG. 5 provides an increased pendulous arm length by maximizing the dimensions of active external reaction mass 82 and positioning active external reaction mass 82 external to internal frame member 92. Thus, the available mass is used more efficiently.

The embodiment of FIG. 5 also results in increased isolation from external stresses, including mounting stresses, by providing localized strain coupling instead of multiplying external strain coupling across the length of the mechanism. The isolation function of external isolation features, for example, isolation slots 32, 34 as illustrated in FIG. 2, is obviated. Rather, the isolation function is performed by central pedestal mount 94. Central pedestal mount 94 isolates the sensor mechanism from external strains by reducing the interface area to a minimum and by placing the interface point at the center of sensor mechanism 80 such that the moment arm over which any strain-induced force acts is also reduced to a minimum. Thus, stress magnitude is minimized and constrained to a s;mall locality. The stressed locality is nearly ideal because it is centrally located and symmetrical relative to the vibrating beam force sensors. Strain-induced forces and interface forces may be further reduced by fixing central pedestal mount 94 to internal frame member 92 using compliant epoxy bonding techniques, for example, the techniques discussed in connection with the embodiment of FIG. 3, above. Additionally, central pedestal mount 94 may be formed of the same material used to manufacture internal frame member 92 such that the thermal expansion coefficients of the two structures match exactly and heat distortion of central pedestal mount 94 does not induce thermal strain at the interface with internal frame member 92. Alternatively, central pedestal mount 94 may be formed on an appropriate surface of accelerometer housing 96 or on an appropriate surface of internal frame member 92 whereby protection from thermally-induced strain may be traded against potentially lower manufacturing costs.

The embodiment of the present invention illustrated in FIG. 5 further provides improved thermal response. The heat capacity of suspended external reaction mass 82 is lower than that of typical sensor designs because the internal mount/external reaction mass configuration provides greater pendulousity using less total pendulous mass. Thus, the raw thermal response time is quicker than in conventional sensor designs due to the higher mass efficiency of the reaction mass. Further thermal response aid results from the centrally localized mounting. Because the heat source is centrally localized by central pedestal mount 94, heat flow paths are simplified. The heat flow paths are nearly symmetrical and easily controlled by conventional methods which allows more precise thermal ramp matching. The improved heat flow paths combined with the reduced heat capacity in the reaction mass produces smaller, more quickly dissipated heat flow-induced errors.

Isolation features may be added around the central pedestal mount 94 to further decouple stress and control heat flow. The isolation features may be provided in internal frame member 86 and may be formed, for example, using one of the isolation systems discussed in connection with the embodiment of FIG. 3, above. Any isolation features may be much smaller than disclosed in the prior art and still prove more effective against the lower initial stress levels because the internal mount/external reaction mass configuration decouples stress and controls heat flow. Thus, simple isolation features known to those of skill in the art will dissipate both stress and direct heat flow. However, as noted above, isolation features are outside the scope of this invention and are not shown.

The shock stop and damping functions are performed in the embodiment of the present invention as illustrated in FIG. 5 by sandwiching internal frame member 92 between top and bottom covers 86, 88. Thus, travel of external reaction, mass 82 along input axis 98 is physically limited by contact between covers 86, 88 and opposing sides of fixed internal frame member 92. Squeeze film damping is provided by providing equivalent gaps between stationary internal frame member 92 and top and bottom cover portions 86, 88 and introducing a pressurized gas into the gaps.

Alternatively, the present invention according to the embodiment illustrated in FIG. 5 may use an external reaction mass 82 which occupies less than the volume formerly occupied by sensor 10. Thus, an acceleration sensor having an active reaction mass commensurate with that of the configuration illustrated in FIGS. 1 and 2 occupies less volume than if configured according to typical sensor designs. Those of skill in the art will recognize that present invention as embodied in the configuration of FIG. 5 provides an opportunity to trade volume for pendulousity and vice versa along a continuum ranging from maintaining the original active reaction mass in a reduced volume sensor to increasing the active reaction mass to fill the original volume. Those of skill in the art will further recognize that the degree to which volume is trade:d for active reaction mass is dependent on many design factors including, for example, available space in which to mount the acceleration sensor, the g-range required by the application, and the materials used in manufacturing the sensor.

The present invention resolves the manufacturing cost issues presented by conventional sensor designs by providing the inventive features at essentially no additional manufacturing cost. Neither additional components nor additional processing are required to practice the present invention. The accelerometer topology of the present invention simply reconfigures previously static cover mass to an active condition.

Preferred embodiments of the invention have been described. Those of skill in the art will recognize that many alternative embodiments of the present invention are possible. In many alternative embodiments of the present invention the effective mass center can be placed at a larger radius from the flexures. Thus, the pendulousity increase can be even greater than the active mass increase. Similarly, the effective center of damping can also be moved to a larger radius from the flexures to provide greater damping using a smaller area.

Those of skill in the art will recognize that the present invention can be applied to various types of accelerometers utilizing a reaction mass including, but not limited to, vibrating beam accelerometers, capacitive accelerometers, capacitive rebalance accelerometers, and translational mass accelerometers. For at least these reasons, the invention is to be interpreted in light of the claims and is not limited to the particular embodiments described herein.

I claim:

1. A method of manufacturing a pendulous accelerometer, comprising the steps of:

forming a reaction mass comprising:
   a) an external pendulum portion formed with a passage,
   b) first and second covers, said covers attached to and spaced away from said external pendulum portion, and
   c) said external pendulum portion and said covers defining an internal cavity in said reaction mass;

forming a frame disposed within said cavity;

rotably suspending said reaction mass from said frame;

fixing said frame to a housing; and mounting a detector between said frame and said reaction mass, said detector measuring a displacement of said reaction mass relative to said frame.

2. The method of claim 1 wherein said frame includes an internal frame member and a pedestal portion extending between said internal frame member and said housing.

* * * * *